(12) United States Patent
Sagmeister

(10) Patent No.: US 12,034,358 B2
(45) Date of Patent: Jul. 9, 2024

(54) ELECTROMOTIVE TRANSMISSION DEVICE

(71) Applicant: ZF Friedrichshafen AG, Friedrichshafen (DE)

(72) Inventor: Martin Sagmeister, Passau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 281 days.

(21) Appl. No.: 17/614,821

(22) PCT Filed: Jun. 2, 2020

(86) PCT No.: PCT/EP2020/065145
§ 371 (c)(1),
(2) Date: Nov. 29, 2021

(87) PCT Pub. No.: WO2020/245085
PCT Pub. Date: Dec. 10, 2020

(65) Prior Publication Data
US 2022/0239196 A1    Jul. 28, 2022

(30) Foreign Application Priority Data
Jun. 3, 2019   (DE) ............... 10 2019 208 034.0

(51) Int. Cl.
*H02K 9/19* (2006.01)
*H02K 5/20* (2006.01)
(Continued)

(52) U.S. Cl.
CPC ............. *H02K 9/19* (2013.01); *H02K 5/203* (2021.01); *H02K 7/003* (2013.01); *F16H 57/046* (2013.01); *F16H 57/0476* (2013.01)

(58) Field of Classification Search
CPC ........... H02K 5/203; H02K 7/003; H02K 9/19
See application file for complete search history.

(56) References Cited

U.S. PATENT DOCUMENTS 5,682,074 A * 10/1997 Di Pietro ........... H02K 15/0012
310/211
10,272,767 B1    4/2019 Tang et al.
(Continued)

FOREIGN PATENT DOCUMENTS

CA    2 116 900 A1    9/1995
EP    3 028 888 A1    6/2016

OTHER PUBLICATIONS

German Search Report Corresponding to 10 2019 208 034.0 mailed Jan. 22, 2020.
(Continued)

*Primary Examiner* — Jue Zhang
(74) *Attorney, Agent, or Firm* — Finch & Maloney PLLC

(57) ABSTRACT

An electromotive transmission device for a vehicle having an electric motor (2) comprising a stator winding (7) and a rotor (5). A drive shaft is driven by an input shaft (12) via a transmission. The transmission is arranged coaxially with the input shaft (12) and the electric motor (2). The stator winding (7) can be cooled by a cooling unit. The transmission has an annular support component, which is joined to the inner face of the radial end wall (11). Pressurized oil is supplied to a radially running annular passage (18) arranged in the end wall (11) and/or the annular support component. A plurality of spray outlets (19) are distributed around the circumference of the annular passage (18) or a radially running slot-like spray outlet. The spray or sprays from the spray outlets (19) are directed at the stator winding (7) and/or the rotor.

10 Claims, 2 Drawing Sheets

(51) Int. Cl.
  *H02K 7/00* (2006.01)
  *F16H 57/04* (2010.01)

(56) References Cited

U.S. PATENT DOCUMENTS

2008/0024020 A1  1/2008  Iund et al.
2018/0328480 A1  11/2018  Nakano et al.

OTHER PUBLICATIONS

International Search Report Corresponding to PCT/EP2020/065145 mailed Sep. 3, 2020.
Written Opinion Corresponding to PCT/EP2020/065145 mailed Sep. 3, 2020.

* cited by examiner

ELECTROMOTIVE TRANSMISSION DEVICE

This application is a national stage completion of PCT/EP2020/065145 filed Jun. 2, 2020 which claims priority from German Application Serial No. 10 2019 208 034.0 filed Jun. 2, 2019.

FIELD OF THE INVENTION

The invention relates to an electromotive transmission device for a vehicle, having an electric motor having a stator winding and a rotor, a drive shaft being drivable in rotation by the input shaft of the electric motor via a transmission, wherein the transmission is arranged coaxially with the input shaft, and the electric motor and the transmission are arranged in a housing which is closed at least on the transmission side by a radial end wall, and wherein the stator winding can be cooled by a cooling device.

BACKGROUND OF THE INVENTION

In such an electromotive transmission device, it is known to surround the stator coil, which is located on the outside, with a spiral channel through which there flows a coolant which absorbs the heat of the stator coil and transports it away. Owing to the spiral channel, the diameter of the housing is increased considerably, so that a large installation space is required for the electromotive transmission device.

SUMMARY OF THE INVENTION

The object of the invention is to provide an electromotive transmission device of the type mentioned at the beginning which is of simple construction and requires a smaller installation space.

This object is achieved according to the invention in that the transmission has an annular carrier component which, abutting the inner side of the radial end wall, is connected to this end wall, wherein there is arranged in the end wall and/or in the annular carrier component a radially circumferential annular channel to which a pressurized oil is supplied, having a plurality of spray outlets arranged distributed around the circumference of the annular channel or a radially circumferential slot-like spray outlet, which are arranged in the annular carrier component and start from the annular channel, wherein the spray jets or the spray jet of the spray outlets are directed at the stator winding and/or at the rotor.

As a result of this simply constructed configuration, no substantial installation space is required for the cooling device, since the components thereof are integrated in already existing components of the electromotive transmission device.

Since the stator winding is cooled not indirectly, as in the prior art, but directly, a very high power density of the electric motor is achieved.

Spray jets can preferably be directed by the spray outlets at an end winding of the stator winding.

For greater distribution of the oil and thus an increased cooling action, the spray outlets can have impact plate nozzles by which the spray jets are directed at the stator winding and/or at the rotor.

The rotor preferably comprises a rotor winding.

The impact plate nozzles preferably generate a cooling oil fan, that is to say a fan-shaped distribution of the spray jets.

In a simple configuration, the spray outlets can be formed in the annular carrier component.

If the annular channel is formed between the end wall and the annular carrier component, the annular channel can be formed in a simple manner by the carrier component or by the end wall of the annular channel by covering an annular groove in the end wall or in the carrier component.

The carrier component can be a planetary carrier of a planetary transmission.

In order to generate the pressure of the oil in the annular channel, the annular channel can be supplied with the oil by a pump.

The oil can be the transmission oil of a lubrication circuit, so that a separate coolant is not required.

For this purpose, there is preferably arranged in the lower region of the housing a drain leading to an oil sump, via which drain the oil can drain off.

The electromotive transmission device can be able to be operated either in motor mode or in generator mode or both in motor mode and in generator mode.

BRIEF DESCRIPTION OF THE DRAWINGS

An exemplary embodiment of the invention is illustrated in the drawing and will be described in greater detail hereinbelow. In the drawings.

DETAIL DESCRIPTION OF THE INVENTION

Figure 1:
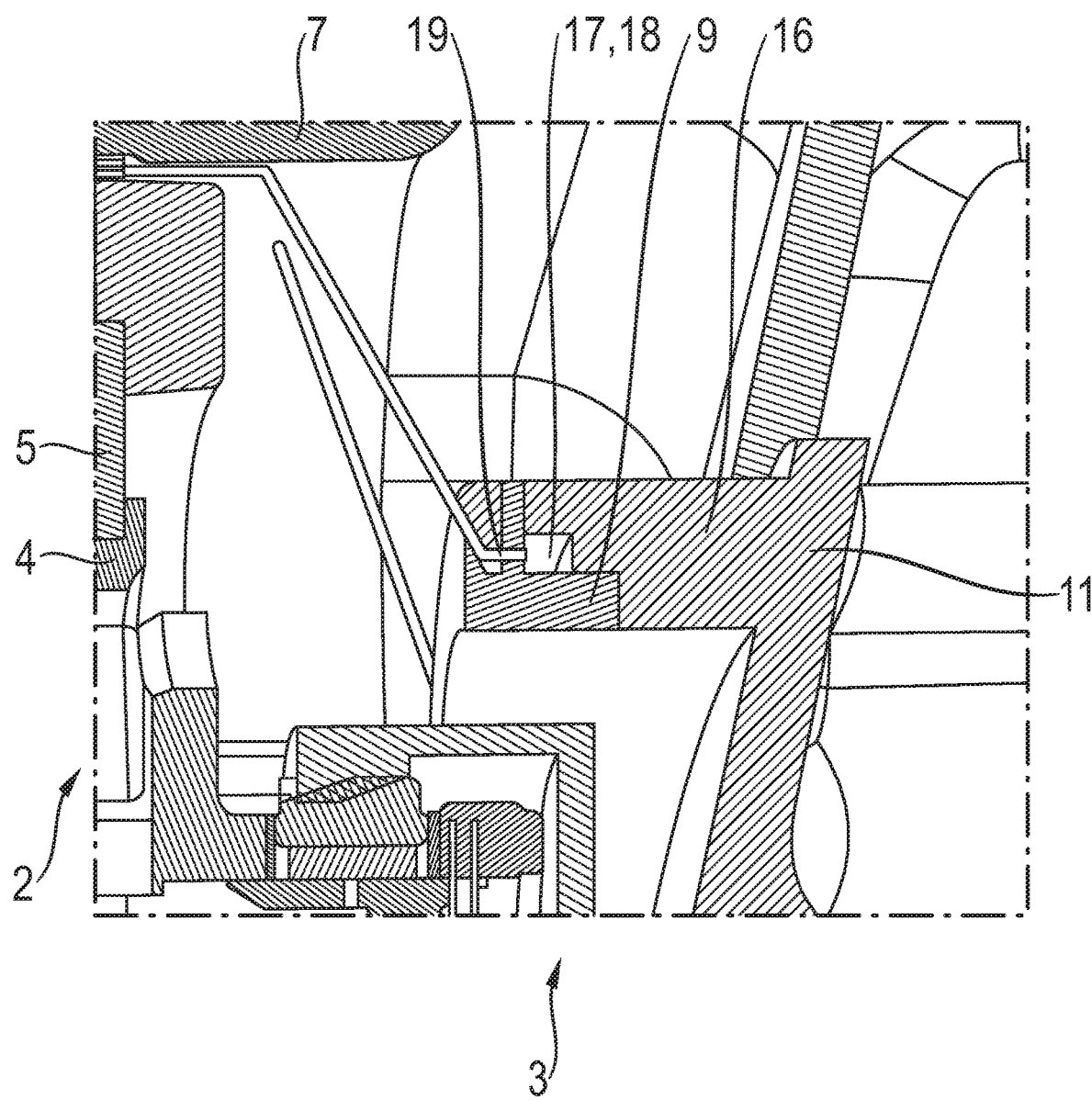
FIG. 1 shows a detail, in longitudinal section, of an electromotive transmission device

The electromotive transmission device illustrated in the figures for a vehicle, in particular for a tractor, has in a housing 1 an electric motor 2 and, coaxially therewith, a planetary transmission 3.

The electric motor 2 has a rotor 4 having a rotor winding 5 and a stator 6 having a stator winding 7. An end winding 8 of the stator winding 7 faces the planetary transmission 3.

The planetary transmission 3 has an annular planetary carrier 9 which has, uniformly distributed over its circumference, for example three radially outwardly directed lugs, at which it is axially connected by means of screws 10 to a radial end wall 11 of the housing 1.

An input shaft 12 of the electric motor 2 is connected to an internal gear 15. A sun gear 13 of the planetary transmission 3 is connected in a rotationally fixed manner to a rotor 4 and engages into four planet gears 14 which are rotatably mounted on the planetary carrier 9 and in turn engage into the internal gear 15 surrounding the planet gears 14, which internal gear in turn has an output shaft, not shown.

The end wall 11 has on its inner side a radially circumferential, coaxially protruding ring 16, the end face of which facing the electric motor 2 is formed with an axially and radially inwardly open annular groove 17. The annular groove 17 is covered axially and radially inwardly by the planetary carrier 9, so that an annular channel 18 is formed.

Starting from the annular channel 18, spray outlets 19 are formed in the planetary carrier 9 in such a manner that they are distributed evenly in a radially circumferential manner, which spray outlets are directed at the windings of the electric motor 2.

Figure 2:
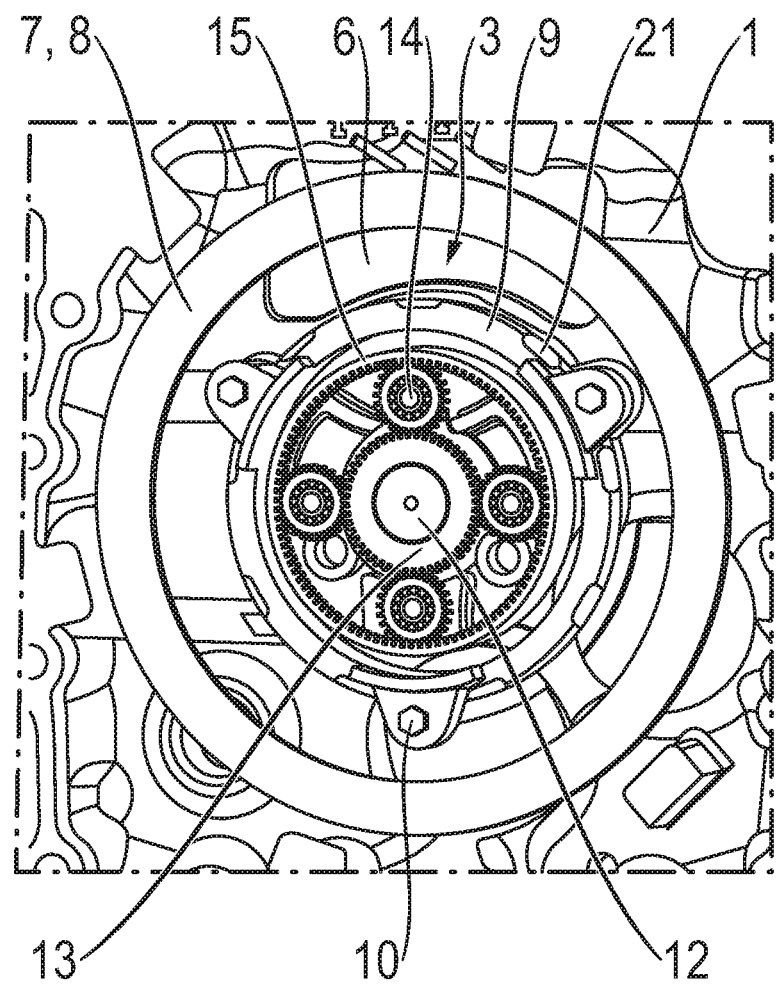
FIG. 2 shows a side view of a second exemplary embodiment of an electromotive transmission device without the radial end wall.

In FIGS. 1 and 2, simple spray outlets 19 are arranged on the planetary carrier 9, while in the exemplary embodiment of FIG. 3 the spray outlets 19 are provided with impact nozzles 21.

The annular channel 18 can be supplied by a pump, not shown, with pressurized oil, which in the exemplary embodiment of FIGS. 1 and 2 strikes the end winding of the stator winding 7 via the spray outlets 19 as a spray jet.

In the exemplary embodiment of FIG. 3, the oil passing through the spray outlets 19 is deflected by the impact nozzles 21 as a spray jet onto the end winding 8 of the stator winding 7.

The oil striking the end winding 8 of the stator winding 7 cools the stator winding 7, which heats up during operation, and then runs, for example, via a drain, not shown, arranged in the lower region of the housing 1 to an oil sump, in which it can cool for reuse.

This device can be operated in motor mode and/or in generator mode.

REFERENCE NUMERALS

1 housing
2 electric motor
3 planetary transmission
4 rotor
5 rotor winding
6 stator
7 stator winding
8 end winding
9 planetary carrier
10 screws
11 end wall
12 input shaft
13 sun gear
14 planet gears
15 internal gear
16 ring
17 annular groove
18 annular channel
19 spray outlets
21 impact nozzles

The invention claimed is:

1. An electromotive transmission device for a vehicle comprising:
    an electric motor having a stator winding and a rotor,
    a drive shaft being drivable in rotation by an input shaft of the electric motor via a transmission,
    wherein the transmission is arranged coaxially with the input shaft, and the electric motor and the transmission are arranged in a housing which is delimited at least by a radial end wall on a transmission side, the transmission is a planetary transmission having a sun gear, an internal gear, and a plurality of planet gears which are rotatably mounted on an annular carrier component,
    the stator winding is coolable by a cooling device,
    the transmission has the annular carrier component which, abutting an inner side of the radial end wall, is connected to the end wall,
    a radially circumferential annular channel, to which pressurized oil is supplied, is arranged in at least one of the end wall and the annular carrier component, having a plurality of spray outlets arranged distributed around the circumference of the annular channel or a radially circumferential slot-like spray outlet, which are arranged in the annular carrier component and start from the annular channel, and
    the plurality of spray outlets are arranged such that spray jets of oil or a spray jet of oil are directed at least one of the stator winding and at the rotor winding.

2. The electromotive transmission device according to claim 1, wherein the spray jets of oil are directed by the spray outlets at an end winding of the stator winding.

3. The electromotive transmission device according to claim 1, wherein the spray outlets have impact plate nozzles by which the spray jets of oil are directed at least one of the stator winding and at the rotor winding.

4. The electromotive transmission device according to claim 1, wherein the spray outlets are formed in the annular carrier component.

5. The electromotive transmission device according to claim 1, wherein the end wall has an annular ring that extends from the inner side of the end wall toward the electric motor, and the annular carrier component mates with an end of the annular ring such that the annular channel is formed between the end of the annular ring and the annular carrier component.

6. The electromotive transmission device according to claim 5, wherein the end of the annular ring has an annular groove that is enclosed and forms the annular channel by the end of the annular ring in contact with the annular carrier component.

7. The electromotive transmission device according to claim 1, wherein the annular carrier component is a planetary carrier of the planetary transmission.

8. The electromotive transmission device according to claim 1, wherein the annular channelis supplied with the pressurized oil by a pump.

9. The electromotive transmission device according to claim 1, wherein a drain leading to an oil sump is arranged in a lower region of the housing.

10. The electromotive transmission device according to claim 1, wherein the electromotive transmission device is operatable in a generator mode.

* * * * *